Sept. 20, 1927.  1,642,699
C. J. SMITH ET AL
AIRPLANE TAIL SUPPORTING WHEEL
Filed Dec. 27, 1926

INVENTORS
Charles J. Smith and
Harold A. Hicks,
BY
ATTORNEY.

Patented Sept. 20, 1927.

1,642,699

UNITED STATES PATENT OFFICE.

CHARLES J. SMITH, OF DEARBORN, AND HAROLD A. HICKS, OF DETROIT, MICHIGAN, ASSIGNORS TO FORD MOTOR COMPANY, OF DETROIT, MICHIGAN.

AIRPLANE-TAIL-SUPPORTING WHEEL.

Application filed December 27, 1926. Serial No. 157,339.

The object of our invention is to provide an airplane tail supporting wheel, of simple, durable, and inexpensive construction.

A further object of our invention is to provide such a wheel with a mounting of the caster type, so that the wheel may be permitted to swing to accommodate itself to swinging movements of the airplane while the tail is on the ground.

Still a further object of our invention is to provide such a wheel on a combined caster and shock absorber connection with the fuselage so that the wheel may accommodate itself to swinging movements of the airplane, due to changes of direction or unevenness of the ground.

Still a further object of our invention is to provide such a wheel with a caster connection to the fuselage with means for normally yieldingly urging the wheel to position to cause the airplane to move straight forward.

Still a further object of our invention is to provide a wheel having a shock absorber caster type mounting with means for normally, yieldingly, urging it to position with its axis perpendicular to the vertical axial plane of the fuselage.

Still a further object is to mount the wheel so that the axis of the caster connection with the fuselage is vertical or inclined forwardly and upwardly when the plane is resting on the ground.

With these and other objects in view our invention consists in the arrangement, construction and combination of various parts of our improved device, as described in the specifications, claimed in the claims, and illustrated in the accompanying drawings in which Fig. 1 shows a side elevation of a portion of a fuselage, the rudder and the tail supporting wheel of an airplane, parts being broken away to better illustrate the construction.

Figure 1:
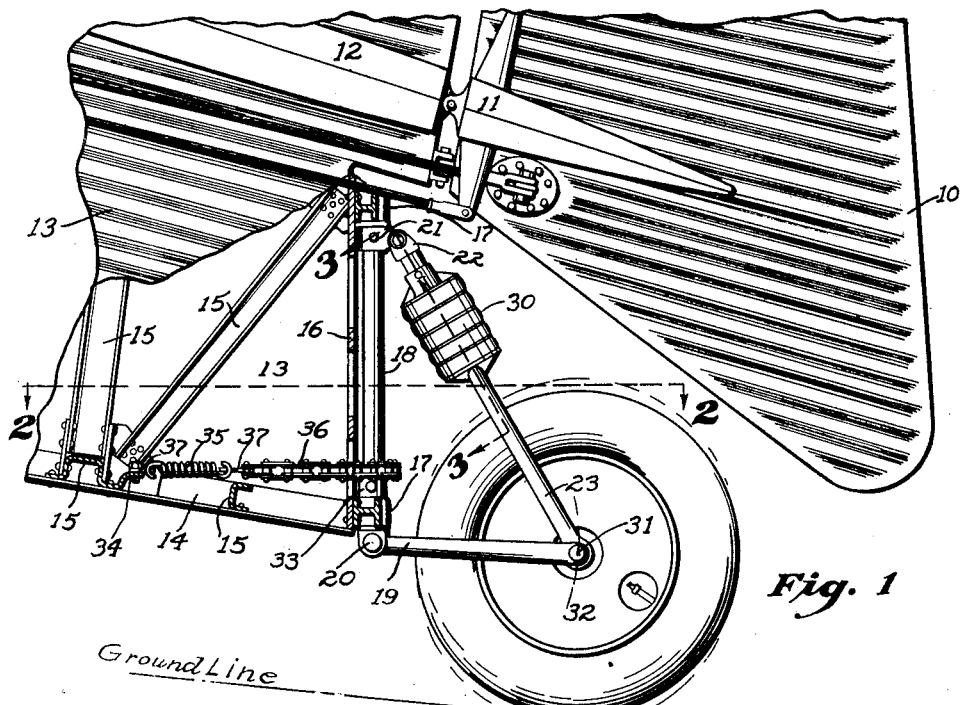
Figure 2:
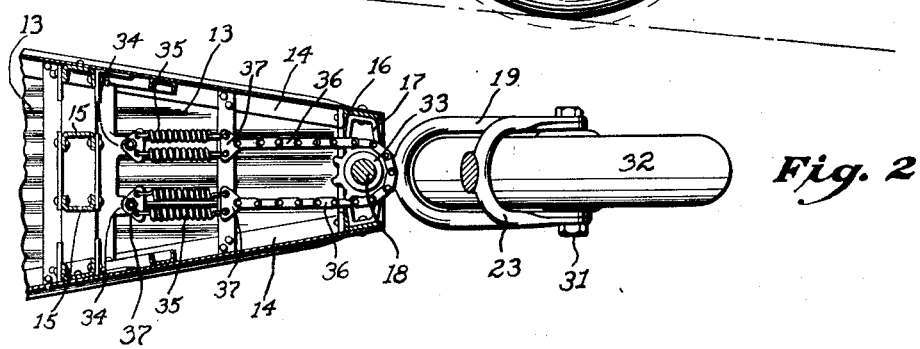
Fig. 2 shows a sectional view taken on the line 2—2 of Fig. 1.

Referring to the accompanying drawings, I have used the reference numeral 10 to indicate generally the rudder of an airplane having shiftable elevators 11 and fixed elevators 12, all of which are mounted on the fuselage to which I have given the general reference numeral 13. The fuselage is provided near the top and bottom edges thereof with converging longerons 14 between which are a plurality of transverse and vertical struts 15. At the rear end of the fuselage a pair of bearing brackets 17 are secured to the tail post 16 near the top and bottom thereof and are provided with a pair of openings designed to receive and form bearings for an inclined shaft 18. A fork 19 is connected by a clevis construction 20 to the lower end of the shaft 18 and just below the lower bearing bracket 17 so that the fork 19 may be permitted to swing in a vertical plane. A sleeve 21 is mounted on the shaft 18 just below the upper bearing bracket 17 and is pivotally connected by a clevis construction 22 with a second fork 23.

Figure 3:
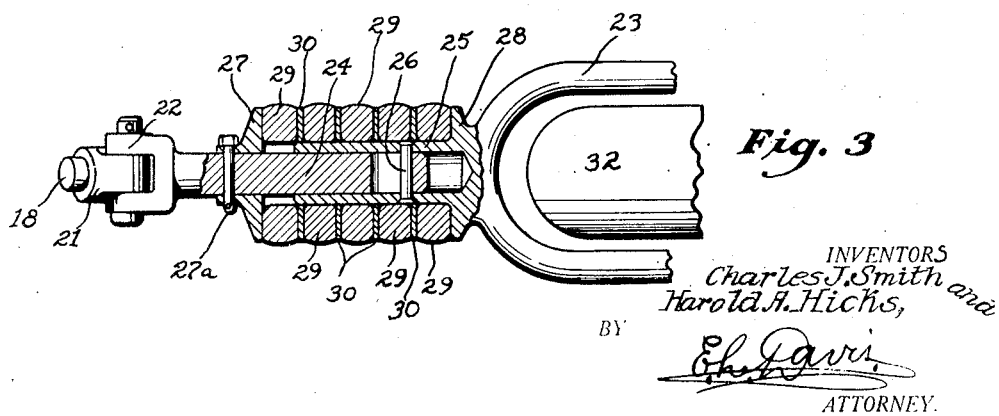
Fig. 3 shows a sectional view taken on the line 3—3 of Fig. 1.

This connection between the clevis 22 and the fork 23 is of the shock absorber type and is more fully illustrated in Fig. 3 from which it will be noted that one arm 24 of the clevis 22 is telescopically connected into a sleeve 25 which extends upwardly from fork 23, relative movement of these parts being limited to a slot constriction 26. A shoulder is formed on the clevis arm 24 in any suitable manner, as by fixing a ring 27 thereto at 27$^a$. A similar shoulder is formed on the fork 23 adjacent to the lower end of the sleeve 25 in any suitable manner as by being formed integrally therewith as illustrated at 28. Disposed between these shoulders 27 and 28 are a plurality of compressed rubber rings 29 with spacing washers 30 there between. The lower end of the fork 23 and the rear end of the fork 19 are pivotally connected to the axle 31 of the tail supporting wheel 32.

A sprocket 33 is fixed to the vertical shaft 18 just above the lower bearing bracket 17 in such a way that the sprocket 33 and clevis 20 may co-act to prevent vertical movement of the shaft 18, relative to the bearing brackets 17.

A pair of spaced ears 34 extend rearwardly from one of the transverse struts 15 and each of these ears 34 have a pair of extensible coil springs 35 secured thereto. The rear ends of these springs 35 are connected to the ends of the chain 36 which extends around the sprockets 33. From the construction which is described it will be seen that the springs 35 together with the chain 36 and sprockets 33 will tend to normally yieldingly urge the shaft 18 to a pre-determined position. These parts are so disposed that when the shaft 18 is in this position the tail supporting wheel will be directly in rear of the fuselage with its axis perpendicular to the vertical axial plane of the fuselage. It will be noted that the ears 34 and the chain 36 are each connected to the springs 35 by triangular equalizing plates 37. These equalizing plates 37 are pivoted at one corner with the chain or ear and the opposite flat side is provided with a plurality of openings to receive the hooked ends of the springs 35. From this construction it will be seen that these equalizing plates 37 may swing upon their pivot axles to cause a substantially equal tension to be placed on each of the springs 35 connected thereto, so that if there is a difference in the tensional strength of these springs then the tension will not cause more pull on one spring than on the other, and also that if one spring should break the other spring would still be connected to guide the wheel.

Shaft 18 is angularly disposed at the rear of the fuselage, its upper end extending forwardly toward the front, when the plane is on the ground. This arrangement stabilizes the rear wheel and prevents a wobbling motion being imparted to the tail of the airplane when the plane is taxiing.

Among the many advantages arising from my improved airplane tail supporting wheel it should be specifically pointed out that I have provided a wheel which automatically aligns itself with the fuselage so that it will be thus aligned when the airplane is either landing or taking off.

The wheel is also mounted so that it will guide the plane smoothly and without wobbling. With the particular construction here shown a shock absorber may readily be provided to take up the initial shock of landing on uneven ground, and either the wheel supporting mechanism or the automatic alignment therefore may be readily controlled or adjusted. The construction is such that the full benefit of a plurality of springs may be obtained by the use of the equalizing plates 37. Further the automatic alignment control is compact so that it will readily fit within the rear end of the fuselage and does not materially alter the wind resistance or the construction of the tail supporting wheel mounting.

Some changes may be made in the arrangement and construction of the various parts of my improved device without departing from the spirit of my invention, and it is my intention to cover by my claims such changes as may reasonably be included within the scope thereof.

We claim as our invention:

1. In an airplane tail supporting wheel, a fuselage, a tail supporting wheel rearwardly thereof, a caster type connection between said wheel and said fuselage, and means for normally, yieldingly urging the wheel to position where its axis is perpendicular to the vertical axial plane of the fuselage.

2. In an airplane tail supporting wheel construction, a fuselage, a tail supporting wheel, a combined caster and shock absorber connection between said wheel and fuselage, and means for normally yieldingly urging said wheel to position with its axis perpendicular to the vertical axial plane of the fuselage.

3. In an airplane fuselage tail supporting construction, a fuselage, a shaft journalled at the rear end thereof for rotation on an upwardly and inclined axis, a substantially rigid fork pivoted to said shaft, a compressible fork pivoted to said shaft, a wheel, an axle for said wheel pivotally connected with said wheel and with the ends of each of said forks and means operatively connected with said shaft for normally yieldingly urging it to position such that the wheel will have its axis perpendicular to the vertical plane of the fuselage.

4. In an airplane tail supporting construction, a fuselage, a shaft journalled for rotation on an inclined axis therein, a wheel, a caster connection between said shaft and wheel, a sprocket mounted on said shaft, a chain adapted to co-act with said sprocket, and yielding means operatively connected with said chain and adapted to normally yieldingly urge this chain and sprocket to a pre-determined position to thereby govern the normal position of the wheel relative to the fuselage.

5. In an airplane tail supporting wheel, a fuselage, a tail supporting wheel adjacent thereto, and a caster type connection between said wheel and said fuselage, the axis of said connection being inclined forwardly and upwardly when the airplane is resting on the ground.

CHARLES J. SMITH.
HAROLD A. HICKS.